United States Patent [19]

Tapiei

[11] 3,870,830

[45] Mar. 11, 1975

[54] AUTOMATIC TELEPHONE DIALER

[76] Inventor: Fa-Kuei Liu Tapiei, 64-3 Lane 40 San Road, Taiwan

[22] Filed: Jan. 14, 1974

[21] Appl. No.: 432,895

[52] U.S. Cl. .............. 179/90 CS, 250/569, 179/2 A

[51] Int. Cl. ............................................ H04m 1/48

[58] Field of Search ........... 179/90 CS, 90 AD, 2 A, 179/5 R; 235/61.11 E; 250/552-3, 555, 557, 569, 215, 90 B

[56] References Cited

UNITED STATES PATENTS

| | | | |
|---|---|---|---|
| 3,111,562 | 11/1963 | Shoji | 179/90 CS |
| 3,328,589 | 6/1967 | Ferguson, Jr. | 250/569 |
| 3,510,593 | 5/1970 | Chappell | 179/90 CS |
| 3,592,972 | 7/1971 | Lane | 179/90 CS |
| 3,592,973 | 7/1971 | Gray | 179/90 CS |
| 3,611,292 | 10/1971 | Brown et al. | 250/569 |
| 3,727,010 | 4/1973 | Fuyama et al. | 179/90 CS |

*Primary Examiner*—Kathleen H. Claffy
*Assistant Examiner*—Gerald L. Brigance
*Attorney, Agent, or Firm*—Dawson, Tilton, Fallon & Lungmus

[57] ABSTRACT

A system is disclosed for automatic dialing of a telephone number which is indicated on a prepared card by a series of apertures located in predetermined positions and representative of the number desired to be called. At the end of a dialing sequence, the receiver set is connected to the telephone line for voice communication. An automatic re-dialing circuit is provided in the event that it is desired to re-dial the number if it is busy. Further, provisions are made for automatic transferring of an incoming call in accordance with the information on an apertured card left in the card slot on the console. A conference call may be arranged by automatic dialing of a second number and communicating it, together with the receiver set at the user position, with the incoming call. An alarm system may also be coupled into the telephone system and communicated to any number as determined by a card left in the card slot when an alarm is signalled. The automatic dialing feature may also be used to remotely control a switch located at the user position from an incoming telephone line.

12 Claims, 13 Drawing Figures

AUTOMATIC TELEPHONE DIALER

BACKGROUND AND SUMMARY

The present invention relates to a system for automatic telephone dialing.

The of the present invention contemplates that a card of paper or plastic is punched in predetermined locations so as to encode, by means of the punched holes, an array of binary information representative of a telephone number to be dialed. The system includes a small console having a card slot into which the punched card is placed in a stationary position.

The caller then presses a button which closes a switch. Light signals pass through the punched apertures and are encoded in predetermined sequence to electrical binary signals representative of the numbers being called. The electrical signals appear in binary coded decimal arrangement (BCD), and these signals are generated in a photoconductor diode array arranged in a pattern corresponding to the field of all possible punched apertures.

For each dialed digit, the output of the photoconductor diode array is coupled to a decoder which generates the corresponding BCD code. The output of the decoder is coupled to comparison logic circuitry.

Closing of the start switch by an operator also initiates a pulse generator which generates a sequence of pulses at the proper dial pulse interval. These dial pulses actuate the telephone terminal to transmit the dial pulses; and they are also fed to a counter circuit. The output of this counter circuit is fed to the comparison circuit; and when the output of the counter circuit equals the output of the decoder for each dialed digit, as determined in the comparison logic circuitry, the dial pulses for that digit are terminated.

The system then proceeds to the next digit being dialed, and operation continues in the same manner until all digits are dialed.

The final digit location on the apertured card is represented by a line in which no volts appear, and the system senses this and terminates dialing.

After each digit is dialed, a sequence counter is energized to advance sensing of the photoconductor diode array to the next digit; and the output signals for that digit are coupled to the decoder to generate the next BCD code.

If it is desired to re-dial the number when the line being called is busy, the operator presses a second switch which actuates a monostable circuit which, in turn, periodically re-triggers the pulse generator and initiates the dialing sequence repetitively until the number being called answers of the operator discontinues the re-dialing sequence.

The system also includes a conference call feature whereby an incoming call on one line may be transferred to a second line which is called by means of the automatic dialing circuitry discussed above. At the same time, the operator station may also engage in the transferred call, so as to make a conference call, if desired.

The system may be set up to forward the incoming call to the second line automatically by leaving a card in the card slot on the console. This is useful, for example, when a person leaves his office and would like incoming calls transferred to a second location determined by the information on the apertured card left in the dial slot.

The system may also be set up so that a local alarm condition will initiate a dialing sequence, calling the number represented by a card in the dial slot, and transmitting an alarm signal when the called number answers. In this arrangement, if the called number does not answer, or if it is busy, the system can be set up so as to repetitively redial the called number until the alarm is checked or the called number answers.

Still another feature of the present invention enables a remote operator to control a device located at the operator station merely by calling the station; and if the console is set up in this mode, a signal is generated to control a local device—for example, this arrangement could be used to actuate an alarm system.

The system contains a speaker and a visual monitor which indicates dial pulses as well as the presence of audio signal.

Other features and advantages will be apparent to persons skilled in the art from the following detailed description of a preferred embodiment accompanied by the attached drawing wherein identical reference numerals will refer to like parts in the various views.

THE DRAWING

Figures 1, 2, 2A:
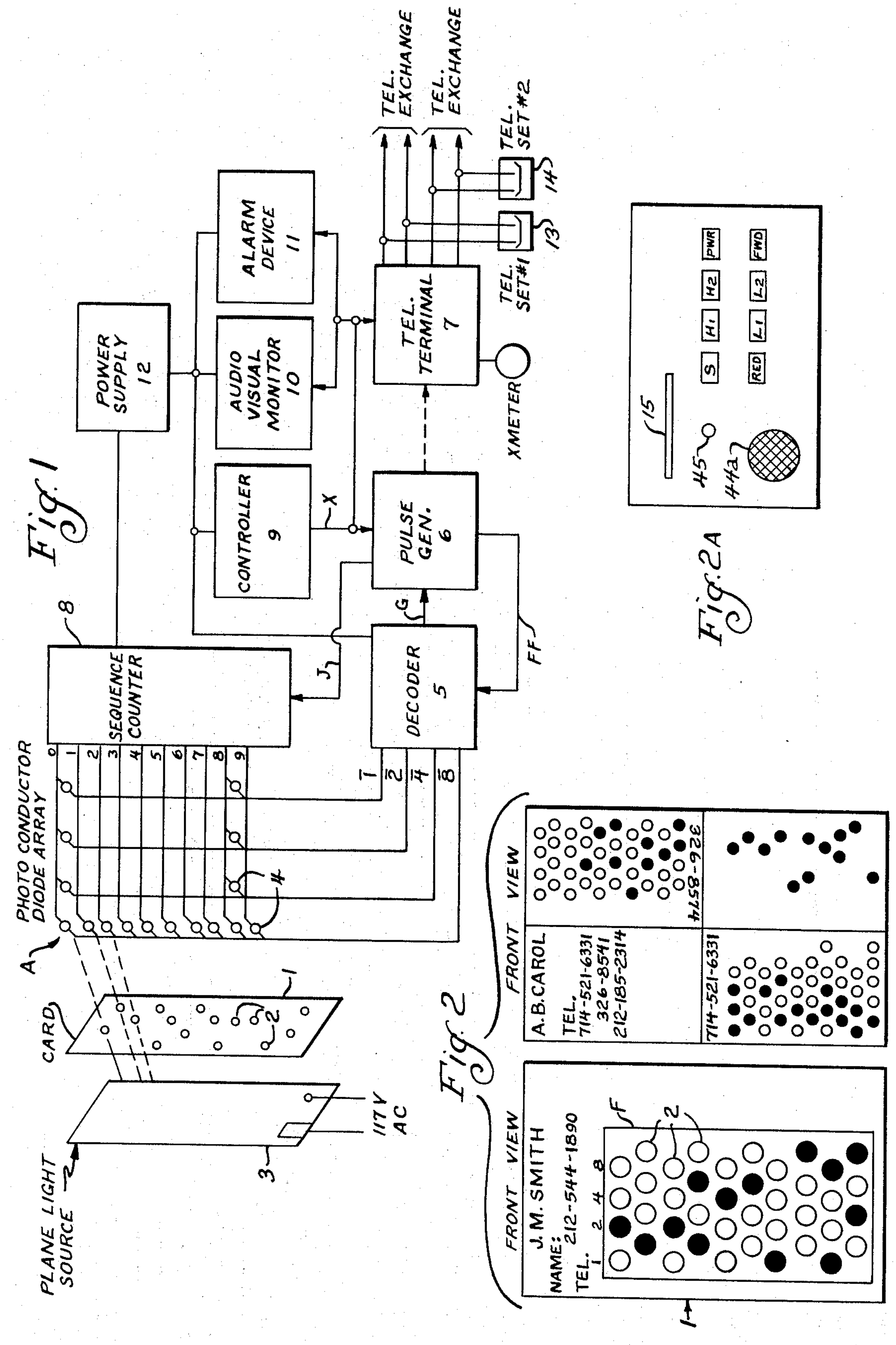
FIG. 1 is a functional block diagram of a telephone dialing system incorporating the present invention.
FIG. 2 illustrates alternative types of apertured cards that may be used with the present invention.
FIG. 2A is a plan view of a console for the system.
Figures 3, 4, 5, 6A, 6B:
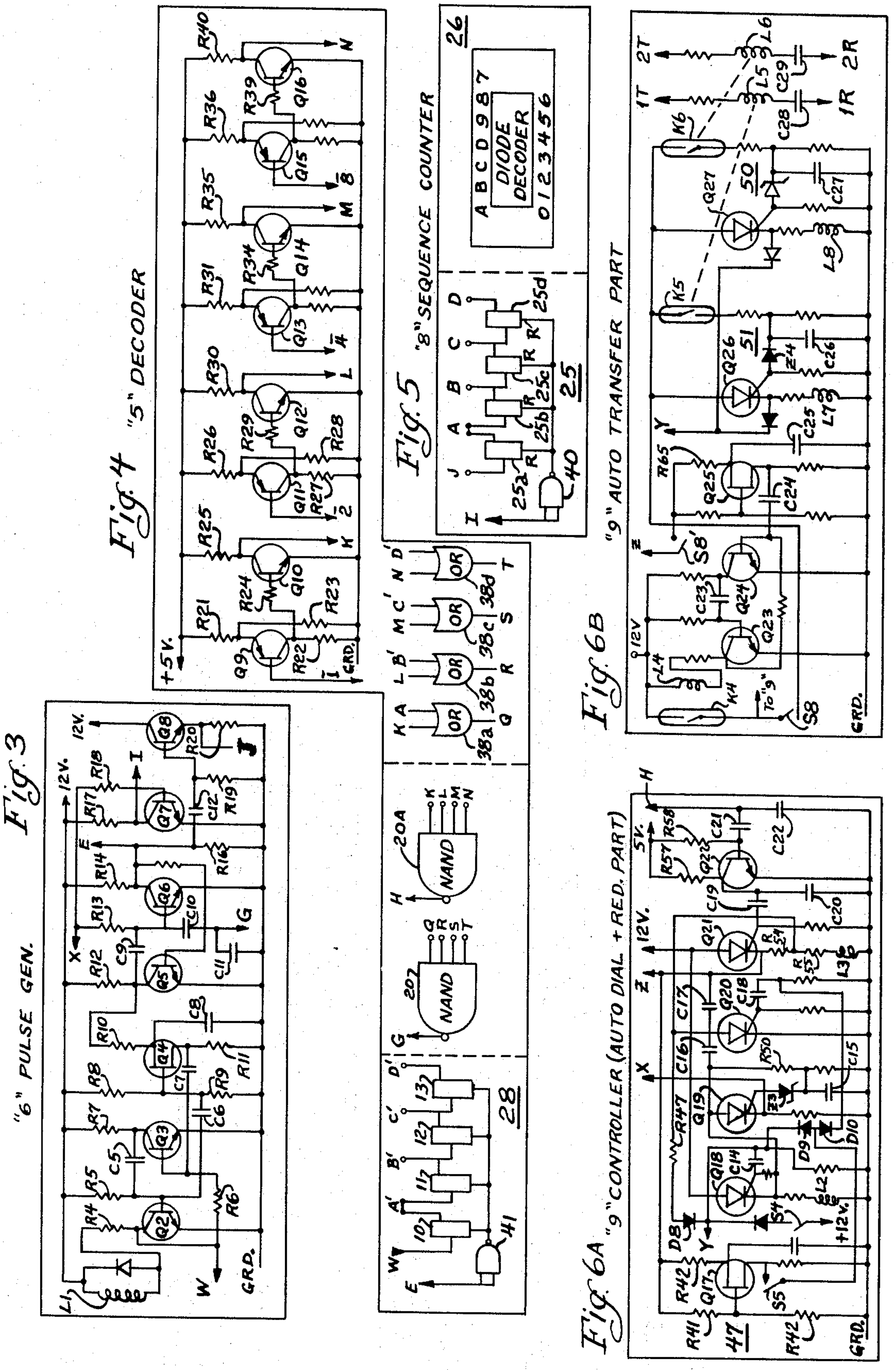
FIG. 3 is a circuit schematic of the pulse generator of FIG. 1.
FIG. 4 is a circuit schematic diagram of the decoder of FIG. 1.
FIG. 5 is a functional block diagram of the sequence counter of FIG. 1.
Figures 7, 8, 9, 10, 11:
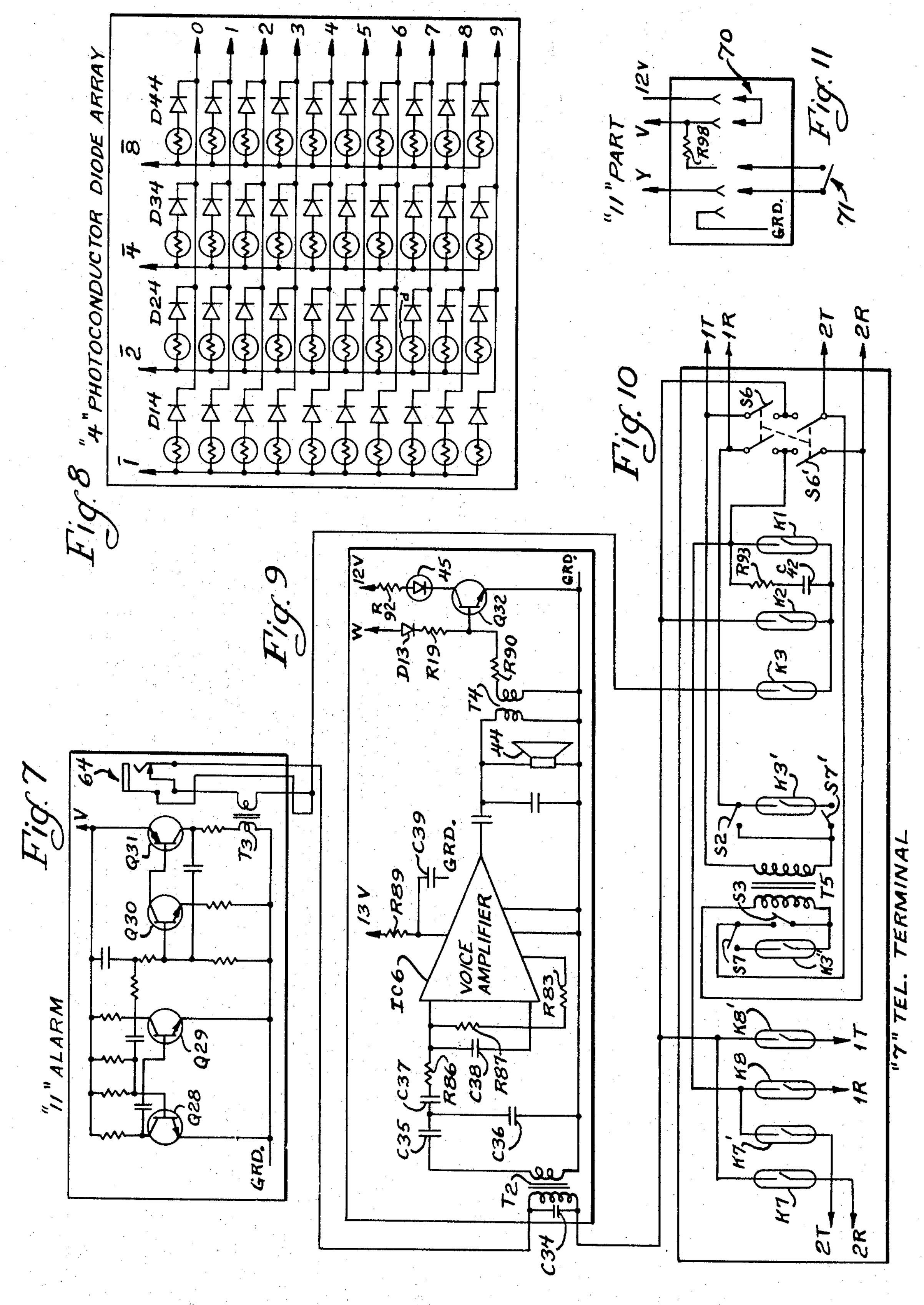

FIG. 6A and 6B comprise the controller of FIG. 1, namely the automatic dialing and re-dialing section and the automatic transfer section respectively; FIG. 7 is a circuit diagram of the alarm portion of the system;

FIG. 8 is a circuit schematic diagram of the photoconductor diode array;

FIG. 9 is a circuit schematic diagram of the audio-visual section of the system;

FIG. 10 is a circuit schematic diagram of the telephone terminal; and

FIG. 11 is a wiring diagram illustrating how a remote control may interface with the system.

DETAILED DESCRIPTION

Referring first to FIG. 1, reference numeral 1 generally designates a telephone dialing card having apertures denoted by reference numeral 2. The card 2 is interposed between a plane source of light 3 and a photoconductor diode array generally denoted by A and including a plurality of individual photoconductor diodes 4.

Turning now to FIG. 2, there are shown two different dialing cards that may be used. These cards are not interchangeable, the system would have to be revised, as will be apparent, depending on which card is used. In the card to the left of FIG. 2, designated FIG. 1, there is only one field of apertures, designated F. The field F is arranged in a number of rows of aperture locations. Each row is representative of a digit in the number being dialed in binary decimal code. An aperture, represented by a darkened circle in the drawing, contains the digit information; and the undarkened circles represent aperture locations which have not been punched. These may be score lines if a cardboard card is used so that the apertures may easily be produced with a pencil. In the illustration to the left of FIG. 2, the telephone number is indicated on the card as 212-544 1890. Thus, the uppermost row is a binary coded decimal digit representative of the decimal numeral 2, and so on.

The card to the right in FIG. 2 is divided into quadrants and contains three separate number fields, one in the upper right-hand quadrant, one in the lower right-hand quadrant, and one in the lower left-hand quadrant. The upper left-hand quadrant is left for the typing of identification and numbers. In this embodiment, the arrangement of the plane light source 3 and the diode array A would be aligned only with the number field in the lower left-hand quadrant of the card as viewed in FIG. 2. If it were desired to use the upper right-hand quadrant numerals, the card would be rotated parallel to the plane of the page 180°; and if it were desired to use the numeral field in the lower right-hand quadrant, the card would be turned over out of the plane of the page.

The card 1 may be made of paper and plastic laminated together for durability. The card may be plated with a layer of gold or silver paint on one side for decorative purposes as well as to provide greater opacity for the non-apertured areas.

Returning now to FIG. 1, the plane light source 3 is a solid state element which emits a soft greenish color glow. When the card 1 is properly placed in a card slot on a console, the field F is aligned with the light source 3; and the individual diodes 4 in the array A are located so that each is aligned with a possible aperture location in the field F. Thus, there are 40 individual diodes 4 (four diodes per row × ten rows). Each of the diodes 4 has an electrical resistance which is a function of incident light. Hence, as light from the source 3 is detected by a diode, the resistance of the diode is greatly reduced, thereby permitting current flow.

Each row of four diodes comprising one digit location is fed by a common voltage from a sequence counter 8; and this voltage is fed only to one digit location at a time. The voltage is stepped along or "sequenced" from one digit location to the next, beginning with the first digit and continuing to the lowest order digit.

Each diode 4 in a column is connected to a different input of a decoder 5; and these inputs are designated according to the decimal representation of the corresponding binary digit locaition. That is, the right-hand column is representative of binary 1, the second column from the right is representative of binary 2, and so on. It will be observed that for each energizing signal from the sequence counter 8, the corresponding binary signals for that row of diodes appear simultaneously at the input of the decoder 5 in BCD representation.

Upon initiation of a dialing sequence, a pulse is transmitted from a controller 9 to a pulse generator 6 along a line X. The pulse generator 6, as will be described, contains a relaxation oscillator which generates a train of sequentially occurring pulses at periodic intervals. These are the dial pulses, and they are used to interrupt the line in the telephone terminal 7 by means of a conventional reed relay, the mechanical coupling being designated by the dashed line 6A. The output of the pulse generator 6 is also coupled back to the decoder 5 along a line FF. The decoder 5 contains a counter circuit which counts the dial pulses from the pulse generator 6, generating a binary representation of the pulses transmitted. The binary representation of the dial pulses in the counter circuit of the decoder 5 is compared in logic circuitry, also to be described, with the input BCD signals from the diode array A; and when the two are the same, a signal is transmitted from the decoder 5 to the pulse generator 6 along the line G to terminate the generation of dialing pulses for that digit. The pulse generator 6 then transmits a signal along the line J to the sequence counter 8 to advance the sequence counter by one to the next occurring digit location. That is, the next row of diodes 4 is energized by a voltage, and all other rows are not energized. Thus, the light being transmitted through the next row of apertures will cause the associated diodes 4 in the next row of diodes in the array A to become energized, thereby transmitting a new set of signals to the input of the decoder 5; and the same sequence will be repeated for each digit location. The controller 9 initiates the generation of dial pulses for each digit location in the number being called; and when all of the digits have been dialed, the system recognizes the end of a dialing sequence because no apertures appear, and the dialing sequence is terminated. It will be appreciated that the digit 0 is represented as decimal 10 (BCD 0110); hence, no apertures in the card represent the BCD signal 0000.

If the number being called is busy, and it is desired to re-dial the number, the card is left in the slot designated 15 in FIG. 2A, and the re-dial switch labelled RED is pushed. This switch on the console shown in FIG. 2A is of the type commonly known as "PUSH-PUSH"—that is, the switch is closed upon a first depression and opened on the next subsequent depression.

When the re-dial button is depressed, a trigger generator in the controller 9 is actuated; and it periodically actuates the pulse generator 6, again along the line X, to reinitiate the entire dialing sequence until the number being called answers or the card is removed from the card slot 15, or the push switch RED is switched to the off position.

The invention also provides for an audio-visual monitor 10 for single line or conference calls, as will be explained in more detail below. Further, an alarm device 11 may be used to initiate an outgoing call with no operator present. An incoming call may also be used to control a local switch. An incoming call may automatically be transferred to a second location as determined by a card left in the dial slot 15. It will be appreciated from FIG. 1 that the system contemplates the use of two telephone lines with two telephone sets at the user location, designated respectively 13 and 14. These and other features of the invention will best be understood from a description of the detailed circuitry involved. A conventional power supply 12 is used to supply power to the various circuits shown in FIG. 1 and to be described presently.

Turning first to FIG. 8, the diode array is shown in more detail. The terminals to the right are designated 0 through 9; and these are the terminals which are sequenced in order with a relatively low voltage, such as ground level. These voltages are fed from the sequence counter 8, as shown in FIG. 5. The sequence counter 8 includes an input counter stage 25 seen to the left of FIG. 5, and an output decoder stage 26. The input counter 25 comprises four bistable circuits 25*a*, 25*b*, 25*c*, and 25*d*, each having a reset terminal R. The input counter 25 counts input pulses fed to a terminal J, and the states of the counter are determined by the signals on the leads A, B, C and D; and these signals are fed to the corresponding inputs A, B, D and D of the decoder section 26. The decoder section 26 is a conventional diode decoder, generating an output signal on one of the output leads 0 through 9 which is an inverted function of the input. That is, if the inputs A, B, C and D are all 0's, then the output labelled 0 would have a ground signal coupled to the corresponding lead 0 of the photoconductor diode array shown in FIG. 8. All of the other outputs 1 through 9 will have a high voltage or 1 signal appearing. The next input signal received at J of FIG. 5 will cause the leads D, C, B and A to have the sequence 0001 respectively; and a ground signal will appear at the output lead designated 1 of the diode decoder 26. This signal will also appear as the ground signal on the corresponding input lead 1 of the diode array of FIG. 8, all other signals remaining in the 1 state. The columns of diodes are connected respectively to the inputs $\bar{1}$, $\bar{2}$, $\bar{4}$ and $\bar{8}$ of the decoder 5, seen in FIG. 4. Each of the lines $\bar{1}$, $\bar{2}$, $\bar{4}$ and $\bar{8}$ is cross-coupled with each of the sequenced lines 0 through 9 as seen in FIG. 8; and each cross coupling location includes a photoconductor diode and a semi-conductor diode permitting current to flow in only one direction, namely toward the input sequenced line which has ground potential on it.

Turning now to the decoder 5, seen in FIG. 4, the BCD output lines $\bar{1}$, $\bar{2}$, $\bar{4}$ and $\bar{8}$ of the photoconductor diode array are coupled respectively to the base terminals of transistors Q9, Q11, Q13 and Q15. The collectors of these transistors are connected through resistors to ground, and the emitters are connected through resistors to the positive terminal of the power supply. The collectors also feed an inverting transistor; and these are designated respectively Q10, Q12, Q14 and Q16, the outputs of the inverting transistors being designated respectively K, L, M and N. For example, if ground potential is applied only to the input sequenced line 7 of the diode array, and the only aperture for that digit location appears in the second column (representative of decimal 2), then incident light will cause the photoconductor diode d to conduct, thereby causing the output BCD $\bar{2}$ to be at ground potential, the other lines being open or having infinite impedance. Conduction of the diode d will cause transistor Q11 to conduct, thereby causing its collector to go relatively positive and, in turn, causing transistor Q12 to conduct. This will cause the signal on the lead L to be at ground potential. The outputs K, L, M and N are individually coupled respectively to the inputs of OR gates 38*a*, 38*b*, 38*c* and 38*d*, also located in the decoder and shown in FIG. 4. The outputs of these OR gates are designated respectively Q, R, S and T; and they are fed to the inputs of a NAND gate 20, also shown in the decoder. The signals on the reads K, L. M and N are also fed to the inputs of a second NAND gate 20*a* in the decoder having an output labelled H.

The function of the NAND gate 20, having an output labelled G, is to terminate the dial pulses from the pulse generator 6 (FIG. 3) and cause it to advance the sequence counter, as will be made more clear presently. The function of the NAND gate 20*a* is to terminate the dial sequence when all of the signals on the leads K, L, M and N are 1's thereby indicating that no apertures are sensed and the dial sequence is to be terminated.

AUTOMATIC DIALING

When it is desired to automatically dial a number, the apertured card is placed in the slot 15 on the console of FIG. 2A; and the pushbutton S is pressed. This closes switch S4 in FIG. 6A which shows that portion of the controller relating to automatic dialing and re-dialing. The pushbutton S is a momentary contact switch—that is, as long as the pushbutton is depressed, a 12-volt signal (which is the value of one voltage supplied by the power supply 12) will be coupled to the gate lead of the silicon controlled rectifier (SCR) Q18 through a capacitor C14 which differentiates the pulse. When the pushbutton S is released, the power is withdrawn from that gate lead. The pulse fed to the gate of Q18 is differentiated by C14. When Q18 conducts, current is supplied to energize the winding L2 of a reed relay. This closes contact K2 in the telephone terminal of FIG. 10. It will be observed that the contact K1 of FIG. 10 has already been closed by transistor Q2 of the pulse generator 6 (FIG. 3) which is in a normally conducting state as soon as power is turned on. The actuating coil L1 of the reed relay is in the collector circuit of transistor Q2. The closing of the contacts K1, K2 contemplates a telephone circuit. One of two telephone line pairs 1T, 1R or 2T, 2R may be selected by one of the console pushbuttons labelled L1 or L2 which actuates the interlocked double-pole, double-throw switches S6, S6' of FIG. 10. S6 and S6' are mechanically coupled so that when one of them is depressed the other one would be released. Assuming that the switch S6 is in the closed position, line 1T–1R has been selected; and the circuit is 1T, S6, K2, K1, S6, 1R. Contact K2 is then used to interrupt the telephone circuit to transmit the dial pulses. If pushbutton L2 had been depressed, switch S6' should close, and line 2T–2R would have been selected, but the operation is otherwise the same. Any number of lines may thus be used, as will be appreciated.

The manner in which the dial pulses are generated will now be described. Returning to FIg. 6A, because Q18 is an SCR, it will latch up in a conducting state once triggered until power is removed. Contact K2 remains closed until SCR Q18 becomes non-conducting.

When Q18 conducts, power is supplied to the anode of SCR Q19. In the gate circuit of SCR Q19, there is a network comprising resistor R50, capacitor C15 and a Zener diode Z3. As the applied voltage builds up on C15, after a delay, the Zener Z3 will reverse-conduct and trigger SCR Q19. The delay of about two seconds, after which time SCR Q19 is caused to conduct, is the normal delay required in the central telephone exchange prior to the generation of dial pulses.

In other words, as power is supplied to SCR Q19, the same power is supplied to capacitor C15. As a charge builds up, ultimately SCR Q19 will conduct. This, in turn, provides voltage via lead X to the base of transistor Q6 (FIG. 3) which forms a monostable circuit with transistor Q5. Initially Q6 is a non-conducting state. A positive voltage on X causes Q6 to conduct; and the voltage at the collector of Q6 will be coupled to the base of Q5, causing it to change from a conducting to a non-conducting state.

At this time, when Q5 is a non-conducting state, it will cause power to be supplied through resistor R10 to a relaxation oscillator including unijunction Q4, and permits it to oscillate. The period of oscillation is determined by the time constant of R11, C8. The trigger pulse from the oscillator is fed through capacitors C6 and C7 to the inputs of a monostable circuit comprising transistors Q3 and Q2 for pulse shaping and through lead W to the input of a counter circuit denoted 28, already described. The counter circuit 28 is part of the decoder 5 of FIG. 4; and it counts the dial pulses. The dial pulses are generated for each output of the monostable circuit which de-energizes winding L1 located in the collector circuit of transistor Q2. In other words, the period of oscillation of the relaxation oscillator including unijunction transistor Q4 is the same as required for conventional dial pulses. Each output pulse from the unijunction causes transistor Q3 to conduct; and this, in turn, causes transistor Q2 to become non-conducting (via capacitor C5). Each time the transistor Q2 becomes non-conducting, winding L1 is de-energized thereby opening contact K1 and transmitting a dial pulse, while at the same time, the counter 28 in the decoder circuit 5 is incremented.

The trigger pulse from SCR Q19 is also coupled to the transistor Q7 of the pulse generator 6 causing it to conduct. This pulse enables an inverting gate 40 in the counter stage 25 of the Sequence Counter 8, thereby permitting it to increment sensing of the diode array of FIG. 8, as already discussed.

The dial pulse rate (10 pps) is determined by the repetition rate of Q4. For each pulse from Q4, Q2 changes state from conducting to non-conducting (for approximately 66 milliseconds for each trigger pulse), it causes the winding L1 of a reed relay to become de-energized. This, in turn, will break the telephone circuit by the contact K1.

The output pulses of the pulse generator, transmitted along the line W from the collector of transistor Q2, are counted in the input counter 28, including the bistable circuits 10–13. As already mentioned, the outputs of these bistable circuits A′, B′, C′ and D′ are coupled to the inputs of the OR gates 38*a*–38*d*, also in the decoder. The inverse function of the BCD signal from the diode array 4 of FIG. 8 is coupled to the inputs K, L, M and N of the same OR gates 38*a*–38*d*. When the number of pulses counted by counter 28 equals the digit being dialed in BCD form, one input to each of the OR gates 38*a*–38*d* will be a 1; thereby causing the NAND gate 20 to generate a negative-going pulse or 0. The output of NAND gate 20 is coupled by a lead G and capacitor C10 to the base of transistor Q6. This causes transistor Q6 to become non-conducting, thereby reversing the state of the monostable circuit comprising transistors Q5, Q6 which, in turn, disables the pulse generator 6 of FIG. 3 for approximately 600 milliseconds. It will be observed that the signal at the collector of transistor Q6 is transmitted via lead E to an enabling gate 41 to reset the counter 28 of the decoder 5. When the pulse generator is disabled as just described, the bistable circuits 10–13 of the counter 28 are reset, and the counter is inhibited from further counting. This terminates the operation for each digit being dialed; and it is deemed helpful if a specific example is given.

Suppose that the digit being dialed is 3. The BCD representation is 0011; hence, for the particular digit selected by the sequence counter in the diode array, the signal on the lines, $\bar{1}$, $\bar{2}$, $\bar{4}$ and $\bar{8}$ will be respectively 1100.

The corresponding sequence generated by the inverter states at the inputs K, L, M and N respectively of the OR gates 38*a*–38*d* will be 0011 (since the order is reversed). This is the same as the output of the diode array which actually does the inverting. When three dial pulses have been transmitted, the BCD output of counter 28 will be 1100 respectively on lines A′, B′, C′ and D′. Hence, the following inputs to the OR gates 38*a*–38*d* will be ONES: A′, B′, M and N. Thus, the NAND gate 20 will be actuated after the third dial pulse is transmitted, and it will disable the pulse generator 6 from the transmission of further pulses. It will also be observed, as discussed above, that the enable gate 40 of the counter stage 25 of the sequence counter 8 is enables by the pulse generator via lead I. This signal is generated by transistor Q7 and SCR Q19 of the controller 9 at the start of each sequence—the signal is not terminated at the end of each train of dial pulses representative of a single decimal digit. The OR gates 38*a*–38*d* thus comprise comparison means for comparing the output signals of the diode array with the output signals of the dial pulse counter 28; and when one is the complement of the other, the NAND gate 20 will generate the negative-going signal to reverse the state of the input monostable of the pulse generator 6. This negative-going pulse, fed via line G, is differentiated by capacitor C10; hence, the transistor Q6 is non-conducting only for a short interval (about 600 MS.) between trains of dial pulses. That is to say, the voltage level of the lead X is isolated from the input at G by the resistor R13; but the level at X remains constant because it is fed from the controller 9, and the SCR Q19 is left in a conducting state. Thus, eventually the transistor Q6 will conduct again to initiate another train of dial pulses; and when it does, it will transmit a pulse through transistor Q8 and lead J to increment the counter stage 25 of the sequence counter 8. This will cause the ground level pulse on the sequence inputs of the diode array 4 to be advanced to the next sequential horizontal line in FIG. 8, thereby presenting BCD signals at the output representative of the next digit desired to be dialed.

Thus, the digits will be dialed in sequence until the last digit has been dialed, the operation of the circuitry repeating itself as already discussed. Finally, after the last digit has been dialed, none of the photoconducting diodes will be sensed, and the signals on lines $\bar{1}$, $\bar{2}$, $\bar{4}$, and $\bar{8}$, will be 1's. Thus, all of the leads K, L, M, and N in the decoder will have 1's, and the NAND gate 20A in the decoder will generate a negative-going pulse along the lead H. This negative-going pulse is coupled to the corresponding lead H in FIG. 6A of the controller 9, where it causes transistor Q22 to become non-conducting for a short period of time since the pulse is differentiated through capacitor C21. When transistor Q22 becomes non-conducting, a positive pulse will be transmitted through capacitor C19 to cause SCR Q21 to conduct. When SCR Q21 conducts, current is supplied to a winding L3 of a read relay in the cathode circuit. When the winding L3 is energized, the contact K3 closes.

This will link the transformers T2 (FIG. 9) and T3 (FIG. 7) into the telephone circuit to couple the voice frequency amplifiers into the telephone circuit for speaking. At the same time, K2 had been closed, and it must be opened or the audio circuits will be short-circuited. The opening of contact K2 is accomplished by the same pulse from SCR Q21 which is coupled from the cathode of Q21 and differentiated through capacitor C17 and C16 to the cathode of SCR Q18 (which cathode circuit also contains the winding L2). This signal will then cause SCR Q18 to become non-conducting and de-energize winding L2 to open the contact K2 after the differentiated pulse has dissipated. When SCR Q18 becomes non-conducting, the input signal at X of the pulse generator 6 also goes to 0. The triangular block labled "AMPLIFIER" in FIG. 9 is the receiving amplifier for voice frequency, but T3 couples in an Alarm Circuit (FIG. 7) to be discussed later.

At the same time, after SCR Q18 becomes non-conducting, Q19 will also become non-conducting because it receives power only when Q18 conducts. It will be remembered that Q19 provided a two-second delay to the input of the pulse generator circuit 6. However, there is no delay when it becomes nonconducting, and this signal is fed directly to lead X to disable the pulse generator which, in turn, resets the counter circuit 25. All further counting is thus inhibited by means of the inverter gate 40 of the sequence counter 8 (FIG. 5). The output of the audio amplifier is connected to a built-in loudspeaker designated 44 in FIG. 9 and located on the console at 44*a* in FIG. 2A. The output of the voice amplifier is also connected by means of a transformer T4 to the base of a transistor Q32, in the collector circuit of which there is a light-emitting diode designated 45. Hence, the light coming from the diode 45 is representative of the intensity of the audio signal that is present; and this light is also on the console of FIG. 2A.

At the base of the transistor Q32 there is a diode D13 which is connected by means of lead W to the output of the pulse generator circuit of FIG. 3 (namely, the collector of transistor Q2), so that a person doing the dialing can see a visual indication of the dial pulses. In summary, the input to the transistor Q32 is an OR gate; and this transistor will conduct either by the dialing pulses or by the presence of audio signal peaks on the line coupled through transformer T4.

If the telephone number being dialed is busy, a busy signal will be heard at the loudspeaker 44, and visually, a rapid oscillation or flashing signal will be observed at the light-emitting diode 45. All of this is being accomplished without lifting the hand set, but only by placing the card in the slot and pressing the start buttons.

AUTOMATIC RE-DIALING

In order to re-dial the same number, the card is left in the slot and the re-dial button RED is pressed to switch S5, see the left side of FIG. 6A.

As mentioned the SCR Q21 was made to conduct at the completion of a dialing sequence. Power at the cathode of Q21 is coupled over to one terminal of Q17 which is a unijunction transistor forming a pulse generator. Closing of the re-dial switch S5, couples the output pulses from this pulse generator generally disignated by reference numeral 47 over to the anodes of two diodes D9 and D10. The pulse coupled through D10 (a positive pulse) is coupled to the gate lead of SCR Q29 via capacitor C18. This will cause SCR Q20 to conduct, and this, in turn, will cause a short circuit to appear across winding L3 and R55 (which are in the cathod circuit of SCR Q21). This, in turn, will open contacts K3 and disconnect the audio circuitry and alarm circuitry from the telephone line. This, in effect, hangs up the telephone by disconnecting it. This first pulse cannot be transmitted through diode D9 because this diode is reverse-biased due to a high potential being coupled through diode D8, resistor R47, resistor R54 and SCR Q21. The next pulse can be transmitted through diode D9 because the junction between resistors R54 and R55 is then at ground potential. This second pulse, coupled through diode D9 causes SCR Q18 to conduct, and thereby turn off SCR Q21 (these two SCR's form a bistable circuit only one of which can be on at the same time due to the cross coupling of the capacitors C16 and C17).

When Q18 conducts, the winding L2 is re-energized, thereby again closing contacts K2 and begining the retransmission of dial pulses. This output of transistor Q18 is again delayed through Q19 for two seconds; and the delayed signal is transmitted through lead X to the input of the pulse generator 6, and dialing will commence again, as discussed above. The period of pulses from the unijunction Q17 is 23 to 25 seconds, thereby supplying enough time to disconnect the telephone line prior to re-dialing. During this time, incoming calls can be received, and if the line being called were busy, it is re-dialed in about one-half minute.

AUTOMATIC TRANSFER OF INCOMING CALLS

This operation is used for example, when there is no one at the console location, and it is desired to transfer all incoming calls to a second location as determined by a card in the card slot. In this operation, it is desired to transfer an incoming call on line 1T–1R to line 2T–2R (or vice versa). In order to do this, the console push-button FWD is used to provide the necessary connections. A card bearing the transfer telephone number is placed in the card slot on the console, and the FWD pushbutton (FORWARD) is depressed on the console. The FWD pushbutton is a four-pole, double-throw switch which closes switches S7 and S7′ (FIG. 10), and switches S8 and S8′ (FIG. 6B). At this time, the re-dial switch S5 (FIG. 6A) is open.

Turning now to FIG. 6B which contains the automatic transfer portion of the controller 9, the incoming ring current is received on the calling line; and, for example, if it comes in on line 1T–1R, it is detected by a ring pick-up circuit 51 and energizes the winding L5 of a reed relay which closes the contacts K5. There is another ring pick-up circuit generally designated by reference numeral 50 associated with line 2T–2R and relay L6 and contact K6.

As mentioned, the four switches S7, S7′, S8 and S8′ are actuated by the FWD pushbutton on the user's console. The incoming ring signal will cause the corresponding reed, for example, K5, to vibrate. Charge begins to build up on capacitor C26 each time the reed K5 closes. When sufficient charge has built up to overcome the breakdown voltage of the associated Zener diode Z4, then SCR Q26 will conduct, thereby energizing the winding L7 in its cathode circuit.

Contacts K7 and K7′ actuated by the winding L7 are seen in the lines 2T and 2R at the left-hand portion of FIG. 10. Note that the lines from contacts K7, K7′, K8 and K8′ are connected to the center terminals of the switches S6. Thus, line 2T–2R may be connected to the center points of switches S6 and S6′ and hence connected to the line 1T–1R by closing of contacts K8 and K8′ when the ring signal is detected on line 2T and 2R. In summary, with the FWD button depressed, the ring current on the other line will actuate the associated contacts K7, K7′ or K8, K8′.

At the same time, the ring pick-up circuits 50, 51 of the incoming call generate a signal at the output terminal Y of FIG. 6B, by triggering an associated SCR Q26 or Q27. The lead Y is connected via capacitor C14 of FIG. 6A to the gate lead of SCR Q18, causing it to conduct. This, again, is similar to depressing the start button S and closing the switch S4. That is to say, it starts the dialing sequence. This time, the dialing sequence as determined by a card left in the dial slot of the console is transmitted out across the selected output line. At the completion of the dialing digit sequence, SCR Q21 will conduct as already discussed, thereby energizing winding L3. This will close the contacts K3, K3′ and K3″ of FIG. 10, thereby coupling the incoming call to the selected outgoing lines.

An incoming call is transferred through transformer T5 to the selected outgoing line. For example, when winding L3 (FIG. 6A) is energized, contact K3′ closes to complete a loop as follows: 1T, T5, S7′ (closed by the operator), K3′, 1R. The outgoing loop is completed 2T, S7, K3″, T5, 2R. At the same time, contact K3 couples the amplifier circuit 1C6 into the connected lines, permitting a subscriber at the card station also to be connected in a conference call with the subscribers on lines 1T–1R and 2T–2R. In this situation it is assumed that nobody is at the incoming call and the call is therefore transferred immediately to a remote location as identified by the card left in the dialing slot. It is therefore not important that the incoming call can also be monitored by the subscriber at the console. Hence, there is no ringing at the local subscriber. In order to complete the circuit, 2R (left) is connected through K7, and thence through transformer T2, the phone jack switch (64 of FIG. 7) which is normally closed, T3, back to K3, K1 (closed by the circuitry), and then back through K7′ to 2T. Note that the transformer T5 is designed to present a suitable impedance to the incoming line so that it is not appreciably loaded when the outgoing call is switched.

There is another feature here, namely, that in the case of a transferred call, the incoming line will be interrupted after a predetermined time, independent of whether or not the incoming call was completed. This is accomplished by a delay circuit including unijunction transistor Q25 of FIG. 65. After the last digit has been completed, the "Stop" SCR Q21 (FIG. 6A) will provide power along line Z and switch S8′ (which had been closed during the transfer operation) to unijunction Q25. A time period begins from the moment that power is supplied to Q25. The time period (preferably about 3 minutes) is determines by R65 and C25. In other words, initially when power is supplied, the voltage across C25 is zero, and it must build up before a first pulse can be generated.

The output pulse from the unijunction Q25 is coupled through capacitor C24 to a monostable multivibrator circuit including transistors Q23 and Q24. Transistor Q23 is normally conducting, and it thereby provides current for energizing the winding L4 which closes contact K4 which is in series with the switch S8. The pulse from the unijunction, after the three-minute delay, energizes the monostable circuit, thereby causing transistor Q23 to be non-conducting and opening the contacts K4. This will terminate the supply of all power to the ring pick-up circuits 50, 51 (namely, SCR's Q26 and Q27), and also to SCR Q21, which is the final SCR or "stop" SCR in the dialing sequence circuitry. Thus, when the SCR's Q26 and Q27 (which are latching SCR's), are de-energized, reed windings L7 and L8 are de-energized, and the corresponding contacts K7, K7′ and K8, K8′ are opened, thereby disconnecting 2T–2R from 1T–2R, and at the same time, de-energizing L3 (Q21 being opened), thereby disconnecting the input line by opening contact K3. Note that this disconnect feature is present only when the system is in a state of call transfer; if an operator is present, and operates to transfer the call, the disconnect feature is not energized, and the call may continue to be completed for as long as is desired, as explained below.

CONFERENCE CALLS

When an incoming call is received and it is desired to either have the operator transmit that call to a second outgoing line or, in combination with the transfer, conduct a conference call at the user location, the first incoming call is put on hold by pressing button H2 (if the incoming call is on line 2T–2R) which closes switch S3 or by pressing H1 (if the incoming call is on line 1T–1R) which closes switch S2. The second subscriber, for example, if the incoming line is received on 1T–1R may be dialed automatically using the card system, or may be dialed by hand. The two lines are then coupled by means of transformer T5. It will be appreciated that the operator has already switched switch S6 or S6′ to the second position, and if he wants to become a part of the call, may simply use his hand set.

ALARM SYSTEM INTERFACE

This portion of the circuitry is concerned with transistors Q28, Q29, Q30 and Q31 of FIG. 7. These transistors comprise a tone generator which generates an intermittent tone signal. That is, the tone is generated for a period of time of about half of a second (as determined by the time constant of the multivibrator comprising transistors Q28 and Q29), followed by an intermittent quiescent period of about the same time, the multivibrator being symmetrical. The frequency of the tone is determined by the circuitry associated with transistors Q30 and Q31.

Referring to FIG. 11, power is supplied to the tone generator of FIG. 7 via lead V by means of a jumper lead, identified by reference numeral 70. Power is also coupled to an alarm mechanism, diagrammatically illustrated by the switch 71 to the terminal Y, which is the input to the automatic dialing start. In other words, when the alarm system is triggered, the switch 71 is closed, whereby providing an input signal to start automatic dialing which will be repeated as long as a card is left in the card slot if the redial button is also depressed. When dialing is completed, the intermittent tone will be transmitted to the called number via transformer T3 If the re-dial switch S5 is closed, the signal being called will be periodically re-dialed when an alarm is sensed until the call is completed and the alarm signal transmitted. The intermittent tone will continue to be transmitted to the called number until someone checks on the alarm condition by cutting off the power to the system.

When the automatic dialing is completed, switch K3 will be closed, as in the case of normal automatic dialing to complete the telephone circuit, and the tone will be coupled onto the telephone circuit by means of transformer T3. The same tone will be coupled by means of transformer T2 into the receiver voice amplifier of FIG. 9, and thence into the local speaker 44. An external tape recorder may be coupled into the system by means of the phone jack 64 of FIG. 7.

The system is reset to the active alarm state by resetting the power (this is accomplished by switch S1) and opening the alarm switch 71.

AUTOMATIC CONTROL (OR REMOTE CONTROL)

For this operation, the system is set the same as for automatic transfer of an incoming call to an outgoing line except that the outgoing line is not connected to central office line but connected to a controlled device; and the FORWARD and the POWER switches are turned on. A card of at least one digit (any numerical meaning may or may not be a telephone number) is left in the card slot 15.

It is observed that in this situation, at the end of the automatic dialing, the winding L3 is energized, thereby closing contacts K3, K3′ and K3″. It is contacts K3″ which may connect a source of power to a remotely controlled instrumentation. Since the two lines are coupled both to the remote station and through transformer T5 to the incoming line, if the desired response is also set to generate an audible signal, that audible signal may be coupled back to the calling line by means of transformer T5, thereby giving the caller an indication of whether or not a desired action has been taken without having to trigger the unit in any manner.

Having thus described in detailed a preferred embodiment of the invention, persons skilled in the art will be able to modify certain of the structure which has been illustrated and to substitute equivalent elements for those disclosed while continuing to practice the principle of the invention. For example, rather than using a plane source of light and sequencing of rows in the diode array corresponding to the decimal digits being dialed, one could leave all of the photoconductor diodes continuously energized, and use individual light sources, sequencing the rows of light sources. The signals fed to the decoder 5 would be the same, and the sequence counter 8 could be used to sequence the light sources. It is, therefore, intended that all such modifications and substitutions be covered as they are embraced within the spirit and scope of the appended claims.

I claim:

1. A system for automatic telephone dialing comprising: a card defining a plurality of apertures representative of dialing information; sensing means including a source of light on one side of said apertured card and an array of photoconductor elements on the other side of said card for generating sets of electrical signals in sequence and representative respectively in binary coded decimal notation of the decimal digits of the number to be dialed; decoder circuit means receiving said sets of signals for storing the same and including comparison circuit means responsive to sets of binary-coded decimal signals; pulse generator means responsive to a start signal for generating a train of dial pulse signals and for feeding said train of dial pulse signals to said comparison circuit means of said decoder means and to a telephone terminal for transmitting dial pulses, said decoder means accumulating said train of pulses and said comparison circuit means comparing the accumulated pulses with the binary-coded decimal signals from said diode array for terminating said pulse generator when the number of pulses transmitted thereby equals the number represented by said binary-coded decimal signals from said photoconductor array; and controller circuit means for initiating said pulse generator means when it is desired to dial a number, said decoder means being further responsive to the end of a dialed digit sequence to terminate the generation of dial pulses by said pulse generator and to connect the telephone line for signal communication.

2. The apparatus of claim 1 wherein said photoconductor diode array comprises a plurality of photoconductor diodes arranged in columns and rows corresponding to the location of possible apertures on said card when it is in operative relation with said system, each row being representative of a binary-coded decimal group for a dialed digit; said system further comprising sequence counter means responsive to said pulse generator for sequentially energizing said rows of photoconductor diodes in predetermined sequence corresponding to the sequence of digits to be dialed, whereby each row of diodes simultaneously generates a group of binary signals representative of a decimal digit being dialed.

3. The apparatus of claim 2 wherein said decoder means further includes a gate circuit responsive to a preselected group of input signals representative of the end of the dialing sequence for terminating said pulse generator and for resetting said sequence counter.

4. The system of claim 2 wherein said sequence counter circuit means comprises an input binary counter circuit for sequentially counting the number of decimal digits dialed; and binary-to-decimal converter circuit means responsive to the output signals of said input counter circuit means and having a plurality of output lines connected respectively to the rows of diodes in said diode array.

5. The apparatus of claim 1 wherein said controller circuit means further comprises re-dial circuit means for periodically re-actuating said pulse generator to re-dial the number represented by a card left in the system; and re-dial switch means settable by an operator for selectively actuating or disabling said re-dial circuit means in said controller.

6. The system of claim 1 further comprising sequence counter circuit means for sequentially energizing rows of said diode array, each row being responsive to a different decimal digit location on said card; said decoder circuit means including input amplifier means, one for each column of said diode array; comparison logic circuit means including a plurality of gates having two inputs, each gate receiving as one input one of the outputs of said input amplifier means representative of a binary digit from said diode array, binary counter circuit means receiving the pulse of said pulse generator for each digit, said comparison gate means having the other input of each individual gate responsive to the corresponding output digit of said binary counter circuit means; and a gate circuit responsive to the output signals of said comparison circuit means when the number of sequential pulses generated by said pulse generator means is equal to the binary coded decimal signal received in said diode array to generate a transient pulse for terminating temporarily said pulse generator means, whereby said pulse generator means resets said input counter circuit means of said decoder circuit means and increments the input counter circuit of said sequence counter circuit means and continues operation for the next dialed digit.

7. The system of claim 6 wherein said decoder circuit means further includes a second gate responsive to the output of said comparison gate circuit means for sensing a predetermined signal representing the end of a dialed digit sequence for resetting said controller to terminate the dialed sequence.

8. The system of claim 1 further comprising telephone terminal means including a first and a second line; automatic transfer circuit means responsive to the ring circuit of one telephone line for actuating a dial sequence on the other telephone line and for connecting the incoming call to a selected subscriber line.

9. The system of claim 8 wherein said automatic transfer circuit means includes a ring pick-up circuit associated with each line and responsive to a ringing current therein including a delay circuit and a latching switch, each latching switch being connected to said controller circuit means for initiating automatic dialing to a number on said second line represented by a card placed in said system.

10. The system of claim 9 wherein said automatic transfer circuit means further comprises pulse generator means responsive to the initiation of an automatic dialed number when said automatic transfer circuit means is actuated for disconnecting the line called after a predetermined time and for resetting said system.

11. The system of claim 1 further comprising visual means responsive to a voice frequency amplifier receiving incoming audio signals and to said pulse generator for giving a visual indication either of dialed pulses or of incoming voice signals.

12. The system of claim 1 further comprising alarm circuit means for generating a tone signal; actuation circuit means for actuating said alarm signal when an alarm is detected by the actuation of a switch, and for actuating said controller to start automatic dialing of a number represented by a card left in said system and thereafter coupling said tone onto the line called.

* * * * *

UNITED STATES PATENT OFFICE
CERTIFICATE OF CORRECTION

Patent No. 3,870,830 Dated March 11, 1975

Inventor(s) FA-KUEI LIU

It is certified that error appears in the above-identified patent and that said Letters Patent are hereby corrected as shown below:

On page one of the printed matter, please correct the inventor's name to read: Fa-Kuei Liu.

Please correct the inventor's address to read:

64-3 Lane 40,
San Ming Road
Taipei, Taiwan

Signed and sealed this 6th day of May 1975.

(SEAL)
Attest:

RUTH C. MASON
Attesting Officer

C. MARSHALL DANN
Commissioner of Patents
and Trademarks